(12) United States Patent
Yuan et al.

(10) Patent No.: US 8,592,331 B2
(45) Date of Patent: Nov. 26, 2013

(54) FLUOROPHOSPHATE OPTICAL GLASS

(75) Inventors: Junhong Yuan, Sichuan (CN); Yue Zhao, Sichuan (CN); Jinwei Wu, Sichuan (CN)

(73) Assignee: CDGM Glass Co., Ltd., Sichuan (CN)

( * ) Notice: Subject to any disclaimer, the term of this patent is extended or adjusted under 35 U.S.C. 154(b) by 181 days.

(21) Appl. No.: 13/258,750

(22) PCT Filed: Mar. 24, 2010

(86) PCT No.: PCT/CN2010/071269
§ 371 (c)(1),
(2), (4) Date: Sep. 22, 2011

(87) PCT Pub. No.: WO2010/108435
PCT Pub. Date: Sep. 30, 2010

(65) Prior Publication Data
US 2012/0021891 A1    Jan. 26, 2012

(30) Foreign Application Priority Data
Mar. 27, 2009  (CN) .......................... 2009 1 0301181

(51) Int. Cl.
*C03C 3/247* (2006.01)

(52) U.S. Cl.
USPC ........................................................ 501/44

(58) Field of Classification Search
USPC .......................................................... 501/44
See application file for complete search history.

(56) References Cited

U.S. PATENT DOCUMENTS

| | | | | |
|---|---|---|---|---|
| 3,508,937 A | * | 4/1970 | Bromer et al. | 501/44 |
| 3,847,624 A | * | 11/1974 | Broemer et al. | 501/44 |
| 4,213,788 A | * | 7/1980 | Kamiyama | 501/48 |
| 4,427,784 A | * | 1/1984 | Nakamura et al. | 501/44 |
| 5,017,520 A | * | 5/1991 | Otsuka et al. | 501/44 |
| 5,246,891 A | * | 9/1993 | Nakamura | 501/44 |
| 6,429,162 B1 | * | 8/2002 | Prassas | 501/44 |
| 7,151,064 B2 | * | 12/2006 | Otsuka et al. | 501/44 |
| 7,196,027 B2 | * | 3/2007 | Masumura et al. | 501/57 |
| 8,158,541 B2 | * | 4/2012 | Ikenishi et al. | 501/43 |
| 8,354,352 B2 | * | 1/2013 | Ikenishi | 501/44 |
| 2006/0223689 A1 | * | 10/2006 | Ikenishi et al. | 501/45 |
| 2009/0247386 A1 | * | 10/2009 | Ikenishi | 501/44 |
| 2009/0314033 A1 | * | 12/2009 | Zou et al. | 65/60.1 |
| 2009/0325774 A1 | * | 12/2009 | Ikenishi | 501/30 |
| 2011/0287922 A1 | * | 11/2011 | Ikenishi | 501/44 |

FOREIGN PATENT DOCUMENTS

| | | |
|---|---|---|
| CN | 1854100 | 11/2006 |
| CN | 101244890 | 8/2008 |
| CN | 101514079 | 8/2009 |
| JP | 2002234753 | 8/2002 |
| JP | 2006182586 | 7/2006 |

OTHER PUBLICATIONS

International Search for international application No. PCT/CN2010/071269, dated Jul. 1, 2010 (4 pages).

* cited by examiner

*Primary Examiner* — Karl Group
*Assistant Examiner* — Elizabeth A Bolden
(74) *Attorney, Agent, or Firm* — Hamre, Schumann, Mueller & Larson, P.C.

(57) ABSTRACT

The technical problem to be solved by the invention is to provide a fluorophosphate optical glass which has low refraction, low dispersion and low density and is suitable for molding at a low temperature. The fluorophosphate optical glass has a refractive index of 1.45-1.52, an abbe number of 78-85, a transition temperature lower than 465° C., a density lower than 3.8 g/cm$^3$, and a hardness higher than 360 (10$^7$ pa). The fluorophosphate optical glass consists of 18-25 mol % of $AlF_3$, 5-20 mol % of $Al(PO_3)_3$, 7-12 mol % of $MgF_2$, 15-25 mol % of $CaF_2$, 18-25 mol % of $SrF_2$, 8-20 mol % of $BaF_2$, 0-8 mol % of $Ba(PO_3)_2$, 0-3 mol % of $YF_3$ and 0-0.5 mol % of $BaCl_2$. The fluorophosphate optical glass of the invention has the advantages of low refraction, low dispersion, low glass density, higher hardness, good processability, low tapping temperature, easy molding, and ability of effectively preventing stripes.

17 Claims, No Drawings

FLUOROPHOSPHATE OPTICAL GLASS

FIELD OF THE INVENTION

The invention relates to a fluorophosphate optical glass, more particularly to a fluorophosphate optical glass which has a refractive index ($n_d$) of 1.45-1.52 and an abbe number ($v_d$) of 78-85.

DESCRIPTION OF THE RELATED ART

In the modern optical field, high-precision novel photoelectric devices have higher performance requirements for information collection, transmission, storage, conversion and display. Optical elements become more and more light and small, and it is an imperative trend to widely use high-precision and low-cost aspherical mirror instead of the traditionally processed lenses.

As a widely applied novel glass material, the fluorophosphate optical glass has low dispersion and low refractive index, can eliminate special dispersion of secondary spectra from optical systems, improve resolution and obviously improve image quality of the optical system. Furthermore, the fluorophosphate optical glass has low softening point and can be subject to direct precision molding to make high-quality aspherical lens. Moreover, it can be better apochromat to eliminate spherical aberration and optical aberration from spherical optical elements which are hard to be removed, and can replace 2 to 3 spherical lenses to reduce system volume and weight. The fluorophosphate optical glass has been widely applied to high-precision and high-resolution optical instrument combination lenses such as collimator objective lenses, microscopes, astronomical telescopes, digital cameras and LCD projectors, and has become an important novel high-grade photoelectric material with good market prospect.

It is difficult to melt the fluorophosphate optical glass. In the process of melting raw materials of the fluorophosphate optical glass at a high temperature, fluorine component volatilizes heavily at the high temperature, and evaporates from the high-temperature glass surface to form stripes easily; furthermore, since the fluorophosphate optical glass has light viscosity and is difficult to be molded, tapping temperature during the glass molding must be controlled. The lower the tapping temperature is, the more easily the glass is molded. Volatilization of the fluorine can also be effectively controlled to reduce occurrence of the stripes.

As the fluorophosphate optical glass has higher abbe number and has abnormal partial dispersion performance, the fluorophosphate optical glass with the abbe number of 80 or greater has been put into use. For example, Japanese Kokai No. 2002-234753 discloses a fluorophosphate optical glass with the $n_d$ of 1.489-1.510, and the $v_d$ of 79.2-83.1. However, the mole percent of $MgF_2$ in glass composition is 3-6 mol %, and the glass has low hardness and high abradability, which are unfavorable for subsequent processing.

CN1854100A discloses a fluorophosphate optical glass with a large amount of Li in the glass composition and reduced glass durability.

SUMMARY OF THE INVENTION

The technical problem to be solved by the invention is to provide a fluorophosphate optical glass which has low refraction, low dispersion and low density and is suitable for molding at a low temperature.

The technical solution for solving the technical problem in the invention is a fluorophosphate optical glass which has a refractive index of 1.45-1.52, an abbe number of 78-85, a transition temperature lower than 465° C., a density lower than 3.8 g/cm$^3$, and a hardness higher than 360 ($10^7$ pa).

Further, the fluorophosphate optical glass consists of 18-25 mol % of $AlF_3$, 5-20 mol % of $Al(PO_3)_3$, 7-12 mol % of $MgF_2$, 15-25 mol % of $CaF_2$, 18-25 mol % of $SrF_2$, 8-20 mol % of $BaF_2$, 0-8 mol % of $Ba(PO_3)_2$, 0-3 mol % of $YF_3$ and 0-0.5 mol % of $BaCl_2$.

Further, the fluorophosphate optical glass contains 18-22 mol % of $AlF_3$ and 8-15 mol % of $Al(PO_3)_3$.

Further, the fluorophosphate optical glass contains 17-22 mol % of $CaF_2$, 20-25 mol % of $SrF_2$ and 10-17 mol % of $BaF_2$.

Further, the fluorophosphate optical glass contains 1-5 mol % of $Ba(PO_3)_2$ and 0.1-3 mol % of $YF_3$.

Further, the fluorophosphate optical glass consists of 18-22 mol % of $AlF_3$, 8-15 mol % of $Al(PO_3)_3$, 17-22 mol % of $CaF_2$, 20-25 mol % of $SrF_2$, 10-17 mol % of $BaF_2$, 1-5 mol % of $Ba(PO_3)_2$ and 0.1-3 mol % of $YF_3$.

The fluorophosphate optical glass consists of 18-25 mol % of $AlF_3$, 5-20 mol % of, $Al(PO_3)_3$ 7-12 mol % of $MgF_2$, 15-25 mol % of $CaF_2$, 18-25 mol % of $SrF_2$, 8-20 mol % of $BaF_2$, 0-8 mol % of $Ba(PO_3)_2$, 0-3 mol % of $YF_3$ and 0-0.5 mol % of $BaCl_2$.

Further, the fluorophosphate optical glass contains 18-22 mol % of $AlF_3$ and 8-15 mol % of $Al(PO_3)_3$.

Further, the fluorophosphate optical glass contains 17-22 mol % of $CaF_2$, 20-25 mol % of $SrF_2$ and 10-17 mol % of $BaF_2$.

Further, the fluorophosphate optical glass contains 1-5 mol % of $Ba(PO_3)_2$ and 0.1-3 mol % of $YF_3$.

Further, the tapping temperature of the glass is 620-750° C.

Glass preforms made of the fluorophosphate optical glass.

Optical elements made of the fluorophosphate optical glass.

Optical instruments made of the fluorophosphate optical glass.

The invention has the following advantages: the fluorophosphate optical glass of the invention has low refraction, low dispersion, low glass density, higher hardness, good processability, low tapping temperature, easy molding, and can effectively prevent the stripes.

DETAILED DESCRIPTION OF THE PREFERRED EMBODIMENTS

In order to obtain the optical properties of low refractive index and low dispersion of the optical glass, usually the glass system containing P, Al, F and O must be used. In particular, a large amount of fluorine is added to the glass to form a stable and balanced glass system. Further, for stable production, at least one of Ca, Sr and Ba is introduced as glass modification components which can adjust refractive index and abbe number of glass and improve devitrification resistance. However, the elements having the glass modification effects are not limited to the above-mentioned elements.

The possible components in the fluorophosphate optical glass of the invention are described as follows, and content of each component is expressed in mol %.

$AlF_3$ is an essential component for the invention. Al and F are added to the glass to stabilize formation of the glass, and reduce the refractive index and dispersion of the glass effectively. If the content thereof is too low, the required optical constant range can not be reached; if the content is too high, the glass devitrification resistance would deteriorate. Therefore, the content of $AlF_3$ is limited to 18-25 mol %, and preferably 18-22 mol %.

Al(PO$_3$)$_3$ is an essential component for the invention. Al, P and O are added to the glass to stabilize formation of the glass and improve mechanical strength and chemical stability of the glass. If the content thereof is too low, the effects can not be reached; if the content is too high, the glass refractive index would increase so that the required glass constant range can not be obtained. Therefore, the content of Al(PO$_3$)$_3$ is 5-20 mol %, and preferably 8-15 mol %.

CaF$_2$ can not only reduce the abbe number and specific gravity of the glass, but also stabilize the formation of the glass. If the content thereof is too low, the effects are unobvious; if the content is too high, the glass devitrification resistance would deteriorate. Therefore, the content of CaF$_2$ is 15-25 mol %, and preferably 17-22 mol %.

SrF$_2$ can effectively adjust the glass constants and stabilize formation of the glass. If the content thereof is low, the effects are unobvious; if the content is too high, the required optical constants can not be obtained, and the glass devitrification resistance would deteriorate. Therefore, the content of SrF$_2$ is 18-25 mol %, and preferably 20-25 mol %.

BaF$_2$ can effectively adjust the refractive index of the glass and stabilize formation of the glass. If the content thereof is too low, the effects can not be reached; if the content is too high, the refractive index and the specific gravity of the glass can increase, and chemical stability would deteriorate. Therefore, the content of BaF$_2$ is 8-20 mol %, and preferably 10-17 mol %.

MgF$_2$ can adjust the glass constants and improve the glass hardness and chemical stability. If the content thereof is too low, the effects can not be reached; if the content is too high, the glass is difficult to melt. Therefore, the content of MgF$_2$ is 7-12 mol %.

Ba(PO$_3$)$_2$ can not only stabilize formation of the glass, but also effectively adjust the glass constants. If the content thereof is too low, the effects can not be reached; if the content is too high, chemical stability of the glass would deteriorate. Therefore, the content of Ba(PO$_3$)$_2$ is 0-8 mol %, and preferably 1-5 mol %.

YF$_3$ can effectively adjust the refractive index of the glass. If the content thereof is too low, the effects can not be reached; if the content is too high, the refractive index will exceed the required range. Therefore, the content of YF$_3$ is 0-3 mol %, and preferably 0.1-3 mol %.

BaCl$_2$ can be added as a clarifier. If the content thereof is too high, Cl will erode Pt contained in the melting equipment, therefore, the content is limited to 0-0.5 mol %.

A method for producing the optical glass of the invention is as follows 1) weighing common raw materials of optical glass such as oxide, carbonate and nitrate of each component based on mol percentage, thoroughly mixing and putting into a platinum crucible;

2) melting the materials at 700-1100° C., refining, homogenizing, and then cooling;

3) injecting molten glass into a preheated metal mold, and putting the glass together with the metal mold into an annealing furnace for annealing and cooling to obtain the optical glass.

In the invention, by setting the glass composition, especially the composition within the preferable ranges, the following desirable properties can be obtained: the optical glass of the invention has the refractive index ($n_d$) of 1.45-1.52, the abbe number ($v_d$) of 78-85, the transition temperature (Tg) below 465° C., the density (D) less than 3.8 g/cm$^3$, the glass hardness ($H_K$) higher than 360 ($10^7$ pa), and the tapping temperature ranging from 620° C. to 750° C.

Wherein the refractive index ($n_d$) is the annealing value of (2° C./hour) to (6° C./hour), and the refractive index and dispersion coefficient are tested according to GB/T7962.1-1987 *Colourless Optical Glass Test Methods—Refractive Index and Coefficient of Dispersion*.

The transition temperature (Tg) is tested according to GB/T7962.16-1987 *Colourless Optical Glass Test Methods—Linear Thermal Expansion Coefficient, Transition temperature and Yield Point Temperature*, that is, the transition temperature is the temperature corresponding to an intersection point of the straight extended portion of a low temperature zone and a high temperature on an expansion curve of a sample in case of every 1° C. temperature rise within a certain temperature range.

The density is tested according to *GB/T 7962.20-1987 Colourless Optical Glass Test Methods—Density*.

The glass hardness is tested according to *GB/T7962.21-1987 Colourless Optical Glass Test Methods—Knoop Hardness*.

For testing the tapping temperature of the glass, the glass is made into a 170 mm*7 mm*7 mm sample, which is put into a crystallization furnace to heat to 1200° C. for 4 hours, then taken out and cooled to normal temperature and observed by the aid of a magnifier. The tapping temperature is measured according to devitrification of the glass.

The optical glass of the invention can be used as a glass preformed material for compression molding, or molten glass can be subject to direct compression molding. There is no special limitation for the method for making the glass preforms and the hot molding method, and the well-known production methods and molding methods can be used.

In addition, the glass preforms made of the optical glass of the invention can be subject to compression molding to produce optical elements, or molten and softened optical glass can be subject to direct compression molding to produce optical elements.

Moreover, the optical elements can be used as various lenses such as biconvex lenses, biconcave lenses, plane convex lenses, plane concave lenses and concave-convex lenses, reflecting mirror, prism or diffraction gratings.

Compositions of examples 1-14 of the optical glass of the invention and refractive index, abbe number, transition temperature, density, hardness and tapping temperature of the glasses are all shown in Table 1 and Table 2, and composition of each component is expressed in mol %

TABLE 1

| Component | Example | | | | | | |
|---|---|---|---|---|---|---|---|
| | 1 | 2 | 3 | 4 | 5 | 6 | 7 |
| AlF$_3$ | 18.3 | 20.9 | 21.3 | 20.0 | 24.5 | 21.3 | 22.3 |
| Al(PO$_3$)$_3$ | 17.4 | 10.3 | 8.3 | 14.7 | 8.2 | 9.9 | 12.3 |
| CaF$_2$ | 18.2 | 19.2 | 21.2 | 22.3 | 15.8 | 20.6 | 17.6 |

TABLE 1-continued

| Component | Example | | | | | | |
|---|---|---|---|---|---|---|---|
| | 1 | 2 | 3 | 4 | 5 | 6 | 7 |
| $SrF_2$ | 19.6 | 22.5 | 23.5 | 20.6 | 18.6 | 22.9 | 19.3 |
| $BaF_2$ | 10.9 | 12.8 | 13.4 | 8.3 | 15.4 | 12.7 | 11.2 |
| $MgF_2$ | 7.8 | 9.7 | 10.1 | 9.6 | 11.7 | 8.4 | 8.8 |
| $Ba(PO_3)_2$ | 7.4 | 3.6 | 1.1 | 3.3 | 3.7 | 3.0 | 7.7 |
| $YF_3$ | 0.4 | 0.9 | 0.3 | 1.2 | 1.9 | 1.0 | 0.6 |
| $BaCl_2$ | 0 | 0.1 | 0.3 | | 0.2 | 0.2 | 0.2 |
| $n_d$ | 1.49790 | 1.49700 | 1.50684 | 1.49061 | 1.46312 | 1.49521 | 1.49774 |
| $v_d$ | 81.35 | 81.6 | 78.9 | 82.8 | 83.5 | 81.45 | 80.81 |
| Tg (° C.) | 450 | 464 | 445 | 460 | 465 | 465 | 455 |
| D (g/cm³) | 3.8 | 3.6 | 3.8 | 3.75 | 3.73 | 3.7 | 3.73 |
| $H_K$ ($10^7$ pa) | 380 | 390 | 360 | 390 | 390 | 395 | 380 |
| Tapping temperature (° C.) | 720 | 700 | 690 | 730 | 740 | 650 | 720 |

TABLE 2

| Component | Example | | | | | | |
|---|---|---|---|---|---|---|---|
| | 8 | 9 | 10 | 11 | 12 | 13 | 14 |
| $AlF_3$ | 19.5 | 23.6 | 22.8 | 18.2 | 20.4 | 18.2 | 21.2 |
| $Al(PO_3)_3$ | 10.3 | 10.3 | 8.1 | 11.0 | 10.6 | 13.2 | 18.1 |
| $CaF_2$ | 19.8 | 20.9 | 16.7 | 21.9 | 23.9 | 18.0 | 17.0 |
| $SrF_2$ | 22.1 | 19.9 | 22.0 | 24.6 | 18.5 | 22.5 | 19.6 |
| $BaF_2$ | 12.5 | 10.2 | 18.6 | 10.5 | 12.1 | 11.1 | 15.4 |
| $MgF_2$ | 9.8 | 7.2 | 9.1 | 7.4 | 9.9 | 10.0 | 7.9 |
| $Ba(PO_3)_2$ | 4.8 | 5.9 | 2.2 | 3.0 | 3.6 | 5.8 | 0 |
| $YF_3$ | 1.0 | 1.6 | 0 | 2.9 | 0.9 | 1.0 | 0.6 |
| $BaCl_2$ | 0.2 | 0.4 | 0.5 | 0.5 | 0.1 | 0.2 | 0.2 |
| $n_d$ | 1.49449 | 1.51076 | 1.49488 | 1.50007 | 1.49770 | 1.49820 | 1.49665 |
| $v_d$ | 81.47 | 80.76 | 80.86 | 81.05 | 81.63 | 80.75 | 83.55 |
| Tg (° C.) | 460 | 455 | 453 | 450 | 450 | 458 | 458 |
| D (g/cm³) | 3.7 | 3.75 | 3.74 | 3.74 | 3.71 | 3.7 | 3.71 |
| $H_K$ ($10^7$ pa) | 370 | 373 | 376 | 376 | 372 | 380 | 380 |
| Tapping temperature (° C.) | 700 | 720 | 730 | 740 | 720 | 640 | 740 |

As shown in Table 1 and Table 2, all the optical glasses of the examples of the invention have the optical constants within the specific ranges, that is, the refractive index ($n_d$) of 1.45-1.52, the abbe number ($v_d$) of 78-85, the transition temperature (Tg) below 465° C., the tapping temperature ranging from 620° C. to 750° C., the density (D) less than 3.8 g/cm³ and the glass hardness ($H_K$) higher than 360 ($10^7$ pa), which are suitable for the preforms subject to precision compression molding and precision compression molding.

The invention claimed is:

1. A fluorophosphate optical glass, comprising: a refractive index of 1.45-1.52, an abbe number of 78-85, a transition temperature lower than 465° C., a density lower than 3.8 g/cm³, and a hardness higher than 360 ($10^7$ Pa),
wherein the fluorophosphate optical glass consists essentially of 18-25 mol % of $AlF_3$, 5-20 mol % of $Al(PO_3)_3$, 7-12 mol % of $MgF_2$, 15-25 mol % of $CaF$, 18-25 mol % of $SrF_2$, 8-20 mol % of $BaF_2$, 0-8 mol % of $Ba(PO_3)_2$, 0-3 mol % of $YF_3$ and 0-0.5 mol % of $BaCl_2$.

2. The fluorophosphate optical glass according to claim 1, wherein the content of $AlF_3$ is 18-22 mol %, and the content of $Al(PO_3)_3$ is 8-15 mol %.

3. The fluorophosphate optical glass according to claim 1, wherein the content of $CaF$, is 17-22 mol %, the content of $SrF_2$ is 20-25 mol % and the content of $BaF_2$ is 10-17 mol %.

4. The fluorophosphate optical glass according to claim 1, wherein the content of $Ba(PO_3)_2$ is 1-5 mol %, and the content of $YF_3$ is 0.1-3 mol %.

5. The fluorophosphate optical glass according to claim 1, wherein the fluorophosphate optical glass consists of 18-22 mol % of $AlF_3$, 8-15 mol % of $Al(PO_3)_3$, 17-22 mol % of $CaF_2$, 20-25 mol % of $SrF_2$, 10-17 mol % of $BaF_2$, 1-5 mol % of $Ba(PO_3)_2$, and 0.1-3 mol % of $YF_3$.

6. The fluorophosphate optical glass according to claim 1, wherein a tapping temperature of the glass is 620-750° C.

7. Glass preforms made of the fluorophosphate optical glass according to claim 1.

8. Optical elements made of the fluorophosphate optical glass according to claim 1.

9. Optical instruments made of the fluorophosphate optical glass according to claim 1.

10. A fluorophosphate optical glass, consisting essentially of: 18-25 mol % of $AlF_3$, 5-20 mol % of $Al(PO_3)_3$, 7-12 mol % of $MgF_2$, 15-25 mol % of $CaF_2$, 18-25 mol % of $SrF_2$, 8-20 mol % of $BaF_2$, 0-8 mol % of $Ba(PO_3)_2$, 0-3 mol % of $YF_3$ and 0-0.5 mol % of $BaCl_2$.

11. The fluorophosphate optical glass according to claim 10, wherein the content of $AlF_3$ is 18-22 mol %, and the content of $Al(PO_3)_3$ is 8-15 mol %.

12. The fluorophosphate optical glass according to claim 10, wherein the content of $CaF_2$ is 17-22 mol %, the content of $SrF_2$ is 20-25 mol %, the content of $BaF_2$ is 10-17 mol %.

13. The fluorophosphate optical glass according to claim 10, wherein the content of $Ba(PO_3)_2$ is 1-5 mol % and the content of $YF_3$ is 0.1-3 mol %.

14. The fluorophosphate optical glass according to claim 10, wherein a tapping temperature of the glass is 620-750° C.

15. Glass preforms made of the fluorophosphate optical glass according to claim 10.

16. Optical elements made of the fluorophosphate optical glass according to claim 10.

17. Optical instruments made of the fluorophosphate optical glass according to claim 10.

* * * * *